United States Patent [19]

Cao et al.

[11] Patent Number: 5,540,862
[45] Date of Patent: Jul. 30, 1996

[54] COLORED ELECTRICALLY CONDUCTIVE POLYANILINE COMPOUNDS

[75] Inventors: Yong Cao, Goleta; Paul Smith, Santa Barbara, both of Calif.

[73] Assignee: Uniax Corporation, Santa Barbara, Calif.

[21] Appl. No.: 210,531

[22] Filed: Mar. 18, 1994

Related U.S. Application Data

[63] Continuation-in-part of Ser. No. 830,414, Feb. 4, 1992, abandoned.

[51] Int. Cl.⁶ .................................. H01B 1/00; H01B 1/12
[52] U.S. Cl. ........................ 252/500; 528/422; 528/210; 428/913; 264/73; 264/104
[58] Field of Search ..................... 252/500, 518; 528/422, 423, 424, 210, 214, 215; 428/913; 264/73, 104, 330, 340

[56] References Cited

U.S. PATENT DOCUMENTS

| | | | |
|---|---|---|---|
| 3,963,498 | 6/1976 | Trevoy | 252/501 |
| 4,025,463 | 5/1977 | Trevoy | 252/500 |
| 4,526,706 | 7/1985 | Upson et al. | 252/500 |
| 4,556,623 | 12/1985 | Tamura et al. | 430/83 |
| 4,604,427 | 8/1986 | Roberts et al. | 525/185 |
| 4,759,986 | 7/1988 | Marikar et al. | 428/389 |
| 4,772,421 | 9/1988 | Ikenaga et al. | 252/500 |
| 4,781,971 | 11/1988 | Marikar et al. | 252/506 |
| 4,851,487 | 7/1989 | Yaniger et al. | 252/500 |

(List continued on next page.)

FOREIGN PATENT DOCUMENTS

| | | |
|---|---|---|
| 0210023A2 | 1/1987 | European Pat. Off. |
| 0303360A1 | 2/1987 | European Pat. Off. |
| 0218284 | 4/1987 | European Pat. Off. |
| 0294231A1 | 12/1988 | European Pat. Off. |
| 0345693A1 | 12/1989 | European Pat. Off. |
| 0432929A2 | 6/1991 | European Pat. Off. |
| 0512926A1 | 11/1992 | European Pat. Off. |
| 61-195137 | 8/1986 | Japan |
| 62-012073 | 1/1987 | Japan |
| 62-047109 | 2/1987 | Japan |
| 2-240163 | 9/1990 | Japan |
| WO89/01694 | 2/1989 | WIPO |
| 9010297 | 9/1990 | WIPO |

OTHER PUBLICATIONS

Green et al. *J. Chem. Soc.* (1912) 101:1117–1123.
Kobayashi et al. *J. Electroanal. Chem.* (1984) 177:281–291.
Chiang et al. *Synthetic Metals* (1986) 13:193–205.
Salaneck et al. *Synthetic Metals* (1986) 13:291–297.
Focke et al. *J. Phys. Chem.* (1987) 91:5813–5818.
Andreatta et al. *Mol Cryst. Liq. Cryst.* (1990) 189:169–182.
Andreatta et al. *Polymer Comm.* (1990) 31(7):275–278.
Arjavalinghm et al. *J. Chem. Phys.* (1990) 93(1):6–9 Abstract.
Cameron et al. "Development and Properties of Polyaniline--Polimide Blends" Conference proceedings. Jun. 20, 1989.
Chan et al. *Synth. Met.* (1990) 35(3):333–344 Abstract.
Chan et al. *Synth. Met.* (1989) 31(1):95–108 Abstract.
LaCroix and Diaz *Makromol. Chem,. Macromol. Symp.* (1987) 8:17–37.
LaCroix and Diaz "Polymer Blends on Electrodes" Conference proceedings. Jun. 23, 1987.
Li, *Synthetic Metals* (1991) 40:23–28.
MacDiarmid and Epstein: "The polyanilines: potential technology based on new chemistry and new properties." Conference Proceedings Abstract. May 28, 1990.

(List continued on next page.)

*Primary Examiner*—Linda Skaling Therkorn
*Assistant Examiner*—M. Kopec
*Attorney, Agent, or Firm*—Burns, Doane, Swecker & Mathis, L.L.P.

[57] ABSTRACT

Colored, electrically conductive compositions comprising substituted and unsubstituted polyanilines and functionalized protonic acids and blends with insulating and semiconducting substrate polymers or polymers plus solvents are disclosed as are methods of forming colored electrically conductive articles of polyaniline/substrate/acid mixtures.

15 Claims, 7 Drawing Sheets

U.S. PATENT DOCUMENTS

| | | | |
|---|---|---|---|
| 4,855,361 | 8/1989 | Yaniger et al. | 252/500 |
| 4,893,908 | 1/1990 | Wolf et al. | 350/357 |
| 4,915,985 | 4/1990 | Gould et al. | 252/500 |
| 4,935,163 | 6/1990 | Cameron | 252/500 |
| 4,935,164 | 6/1990 | Wessling et al. | 252/500 |
| 4,963,206 | 10/1990 | Shacklette et al. | 156/99 |
| 4,983,322 | 1/1991 | Elsenbaumer | 252/500 |
| 4,983,690 | 1/1991 | Cameron et al. | 525/436 |
| 5,006,278 | 4/1991 | Elsenbaumer | 252/500 |
| 5,008,041 | 4/1991 | Cameron et al. | 252/500 |
| 5,017,420 | 5/1991 | Marikar et al. | 428/212 |
| 5,079,096 | 1/1992 | Miyake et al. | 428/500 |
| 5,093,439 | 3/1992 | Epstein et al. | 525/540 |
| 5,133,841 | 7/1992 | Higo et al. | 252/500 |

OTHER PUBLICATIONS

Malhotra, *J. Appl. Polymer Sci.*, (1990) 40(5–6):1049–1052.

Monkman and Adams *Synth. Met.* (1991) 40(1):87–96 Abstract.

Shacklette and Baughman *Mol. Cryst. Liq. Cryst.* (UK) 189:193–212 Abstract. Oct. 25, 1989.

Theophilous et al. "Highly conducting polyanilines and polyacetylene/polyaniline composites." Conference Proceedings Abstract. Mar. 11, 1989.

Kaner, R. B., et al., "Plastics That Conduct Electricity", *Scientific American* (1988) 258(2):106–111.

5,540,862

COLORED ELECTRICALLY CONDUCTIVE POLYANILINE COMPOUNDS

This is a continuation-in-part of U.S. patent application Ser. No. 07/830,414, filed on Feb. 4, 1992, and now abandoned with the filing of this application.

FIELD OF INVENTION

This invention relates generally to conducting polymers, and more particularly relates to electrically conductive, shaped articles such as parts, containers, fibers, tapes, films and coatings of colored polyaniline and to methods of forming and use of same conductive articles.

BACKGROUND OF THE INVENTION

Electrically conductive, thermoplastic polymer compounds are of increased practical interest, for instance, for packaging electronic instruments and parts, and to solve a wide range of static decay, static shielding and electromagnetic shielding problems. Often such compounds are made by mixing, for example, carbon black, stainless steel fibers, silver or aluminum flakes or Nickel-coated fibers with insulating bulk thermoplastics such as polystyrene, polyolefins, nylons, polycarbonate, acrylonitrile butene styrene (ABS) copolymers, etc. These filled compounds are subsequently processed into the desired shapes and articles by extrusion, injection or blow molding and the like. Major problems associated with the above filled thermoplastic compounds are that processing of these materials is not trivial, is often associated with excessive machine wear and that their colorability is difficult due to the mechanical and optical properties of the fillers, respectively. For example, it is virtually impossible to produce carbon black filled polymers having a high electrical conductivity that are not black. The importance of colorability of conductive compounds derives from applications of these materials in, for instance, the carpet and fashion industry where product appearance is critical, and for color coding of films, containers, housings and enclosures.

More recently, there has been an increased interest in replacing the carbon black or metal filled compounds with intrinsically electrically conductive polymers and their blends with common insulating polymers. The latter systems are believed to be more cost competitive, easier to process and to exhibit desirable mechanical properties. Among the various conductive polymers, the polyanilines have attracted particular attention because of their excellent environmental stability and their low production costs.

Polyaniline is well known in the art, and the preparation of the electrically conductive form of this polymer based on, for example, contacting polyanilines with protonic acids has been disclosed. Green, A. G., and Woodhead, A. E., "Aniline-black and Allied Compounds, Part 1, "J. Chem. Soc., Vol. 101, pp. 1117 (1912); Kobayashi, et al., Electrochemical Reactions . . . of Polyaniline Film-Coated Electrodes," J. Electroanl. Chem., Vol. 177, pp. 281–91 (1984); U.S. Pat. Nos. 3,963,498, 4,025,463 and 4,983,322; U.S. patent application Ser. No. 714,165. Typical examples of such disclosed protonic acids are HCl, $H_2SO_4$, sulfonic acids of the type $R_1$-$SO_3H$, phosphoric acids, etc. Chiang, J. -C. and MacDiarmid, Alan G., "Polyaniline: Protonic Acid Doping of the Emeraldine Form to the Metallic Regime", Synthetic Metals, Vol. 13, p. 196 (1986); Salaneck, W. R. et al., "A Two-Dimensional-Surface "State" Diagram for Polyaniline" Synthetic Metals, Vol. 13, p. 297 (1986). Such acids form complexes with polyaniline, which, generally, exhibit electrical conductivities of $10^{-3}$ S/cm or more. Thus, the electrical properties make these so-called "doped" polyanilines and their blends and compounds with common insulating bulk polymers suitable for a variety of the antistatic and shielding applications that are currently served by metal or carbon black filled systems. Indeed, certain polyaniline-based systems may be conveniently processed using standard polymer processing techniques without machine wear and exhibit excellent mechanical properties.

However, invariably the polyanilines in the art in their conducting form show very strong absorptions around 300–400 nm (which corresponds to about 3.2 eV) and from 600 nm upwards (which corresponds to 2.0 eV downwards) in the visible spectral range, giving the polymers an intense, dark, black/green/blue appearance; cf. the absorption spectrum in FIGS. 1 through 6.

This very dark blue/green/black color of conventional conductive polyanilines is well recognized. (See, for example the text of Examples 2 and 8 of Patent Cooperation Treaty patent application serial number WO 90/10297.) Polyaniline rendered conductive through protonation with commonly used protonic acids exhibit about the same absorption spectrum, and, hence, the same blue/green/black color. Examples of conductive acid-doped polyanilines which will exhibit this characteristic blue/green/black color are those based on the following dopants:

| DOPANT | REFERENCE |
| --- | --- |
| p-toluene sulfonic acid | WO '297-text Example 8; S. K. Dhawan et al., Polym. International, 25, 1, 55 (1991). |
| 1,5-naphthalenedisulfonic acid, tetrahydrate | WO '297 - text Example 2. |
| benzene sulfonic acid | S. K. Dhawan et al., Polym. International, 25, 1, 55 (1991). |
| sulfosalicylic acid | K. Tzou et al., Synthetic Metals, 53, 365 (1993) |
| HCl | M. G. Roe et al. Physical Review Letters, 60, 2789 (1988); P. M. McManus et al., J. Physical Chemistry, 91, 744 (1987); K. Tzou et al, Synthetic Metals, 53, 365 (1993) |
| $H_2SO_4$ | E. M. Genies et al., J. Electroanal. Chem., 220, 647 (1987) |
| $HClO_4$ | M. Enoue et al., Synthetic Metals, 30, 199 (1989) |
| $HNO_3$ | Y. Li et al., Synthetic Metals, 25, 79 (1988) |
| acetic acid | A. Ray et al., Synthetic Metals, 29, E141 (1989) |
| camphor sulfonic acid (CSA) | See FIGS. 2 and 3 |
| dodecylbenzene sulfonic acid | See FIG. 3 "PANI-DBSA" |
| 1,5-naphthalenedisulfonic acid | See FIG. 4 |
| butylsulfamic acid | See FIG. 4 |
| hydroxyaminosulfonic acid | See FIG. 4 |
| 4-nitrotoluene-2-sulfonic acid | See FIG. 5 |
| m-xylene-4-sulfonic acid | See FIG. 5 |
| 2-acrylamido-2-methyl-1-propanesulfonic acid | See FIG. 5 |
| 2-naphthalene sulfonic acid | See FIG. 6 |
| 4-hydroxy-3-nitroso-1-naphthalene sulfonic acid | See FIG. 6 |
| 2-sulfobenzoic acid | See FIG. 6 |
| sulfoacetic acid | See FIG. 6 |

-continued

| DOPANT | REFERENCE |
|---|---|
| 2-hydroxy-4-methoxy-benzophenone-5-sulfonic acid | See FIG. 7 |
| p-chlorobenzene sulfonic acid | See FIG. 7 |
| phenylhydrazine-p-sulfonic acid | See FIG. 7 |

The conductive polyanilines disclosed by Cameron in U.S. Pat. No. 4,935,163 and by Tamura et al in U.S. Pat. No. 4,556,623 employ dopants which are chemically so similar to these materials that they would yield very similar absorptions and hence similar blue/green/black colors.

From the spectra provided herein as FIGS. 2 through 7 it may be readily seen that the protonated polyanilines of the art are characterized by two strong absorptions, one around 350–400 nm and one from about 600 nm upwards. It can also be seen that the absorption at 400 nm generally is about as strong as that at 850 nm.

Clearly, selection of specific protonic acids to yield conducting polyanilines characterized by distinctly different absorption spectra in the visible range, and therefore colors which range outside of the dark blue/green/black palette of the past, would be desirable. Due to the relatively low conductivity of doped polyaniline, in comparison with silver, steel and other metals, often large amounts of the polymer are needed in compounds or blends with insulating polymers to impart sufficient conductivity for the desired shielding and antistatic applications. Thus, much like the metal and carbon black filled thermoplastic compounds, the colorability of the polyaniline-based systems is believed to be poor and problematic. Clearly, a need exists for methods to fabricate colored, electrically conductive compounds and articles.

SUMMARY OF THE INVENTION

It is accordingly an object of the present invention to overcome the aforementioned disadvantages of the prior art and to provide colored, electrically conductive compounds and articles comprising polyaniline and one or more protonic acids that are functionalized to simultaneously or independently (i) form an electrically conductive complex with the polyaniline, and (ii) provide an absorption in the near infrared, visible or ultraviolet range.

It is additionally an object of the present invention to provide colored, electrically conductive compounds and articles comprising polyaniline and one or more protonic acids that are functionalized to simultaneously or independently (i) forman electrically conductive complex with the polyaniline, (ii) provide an absorption in the near infrared, visible or ultraviolet range, and (iii) induce processibility of the polyaniline.

It is additionally an object of the present invention to provide colored, electrically conductive compounds and articles comprising polyaniline and one or more protonic acids that are functionalized to simultaneously or independently (i) form an electrically conductive complex with the polyaniline, (ii) provide an absorption in the near infrared, visible or ultraviolet range, and (iii) induce processibility of the polyaniline to form intimate admixtures (solutions or the like) with a substrate material.

The terms "substrate" or "substrate polymer" is used herein to indicate a range of insulating (i.e. conductivity of about $10^{-9}$ S/cm or less) and semiconducting (conductivity greater than $10^{-9}$ S/cm such as in the range from about $10^{-8}$ to $\sim 10^{-1}$ S/cm) solvents and polymers. "Polymers" include solids, melts and pre-polymers (oligomers).

It is additionally an object of the present invention to provide shaped articles, fibers, coatings, films, tapes and the like from colored, electrically conductive polyaniline and blends of electrically conductive polyaniline with bulk polymer and pre-polymer substrates.

Additional objects, advantages and novel features of the invention will be set forth in part in the description which follows, and in part will become apparent to those skilled in the art on examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
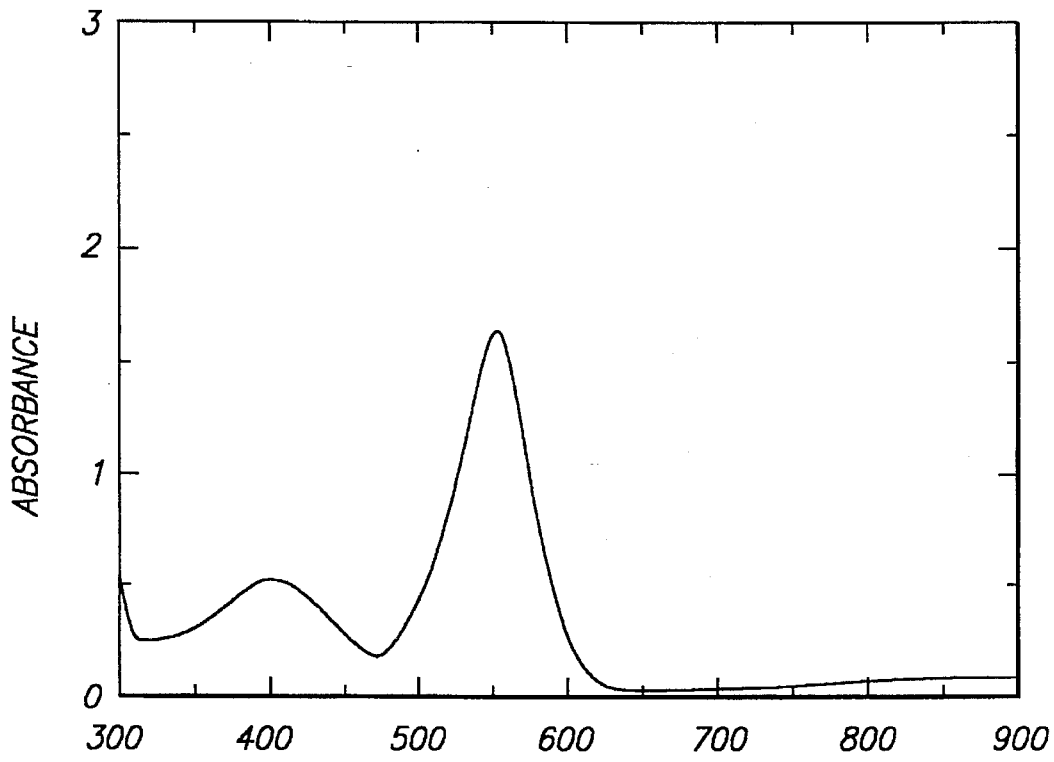
FIG. 1 shows the absorption spectrum of a conducting polyaniline (PANi)-xylenol blue complex cast from m-cresol.

The colored compositions of this invention typically include two or three types of ingredients.

(i) One or more substituted or unsubstituted polyanilines; and (ii) One or more functionalized protonic acid solutes in which the counter-ion(s) have been functionalized so as to simultaneously or independently impart a conductivity to the composition greater than about $10^{-11}$ S/cm, absorbance in the spectral range from 200 to 800 nm, and especially in the visual spectral range of from about 350 nm to about 800 nm, and compatibility with an optional organic substrate phase (iii) are always present;

(iii) One or more substrate phases are optionally present. This phase is insulating or semiconducting organic material and can be an organic liquid such as a solvent or a pre-polymer. It can also be an organic solid or semisolid which is meltable during compounding or mixing with (i) and (ii) and/or during shaping into the colored conductive article, such as melted or softened polymer. It can be mixtures of two or more of these materials. The substrate, when a solvent, may be present during fabrication and removed at least partially in the final product or article.

Surprisingly, it has been discovered that, unlike the electrically conductive compositions described in the prior art, materials can be prepared comprising polyaniline that display a wide variety of intense attractive colors and cover a very broad range of conductivities.

The Polyaniline

One ingredient in the present materials is substituted or unsubstituted polyaniline homopolymer or a polyaniline copolymer as described in U.S. patent application Ser. No. 714,165 and U.S. Pat. No. 4,983,322. Both of these documents are incorporated herein by reference. When the term "polyaniline" is used in this application, it is used generically to include substituted and unsubstituted polyanilines and polyaniline copolymers, unless the context is clear that only the specific nonsubstituted form is intended.

Particularly preferred for the use in the practice of this invention are polyanilines derived from unsubstituted aniline.

In general, the polyanilines useful in the practice of this invention are those which are of sufficient molecular weight to exhibit high electrical conductivity, i.e. having a number average molecular weight of more than 1,000 daltons. In general substituted and unsubstituted polyanilines and polyaniline copolymers will be of at least 8 repeat units. In the preferred embodiments of the invention, the number of repeat units is at least about 10, and in the most preferred embodiments, the number of repeat units is at least about 15.

The polyaniline can be conveniently used in the practice of this invention in any of its physical forms. Illustrative of useful forms are those described in U.S. patent application Ser. No. 714,165 and U.S. Pat. No. 4,983,322. For unsubstituted polyaniline, useful forms include leucoemeraldine, protoemeraldine, emeraldine, nigraniline and toluprotoemeraldine forms. Useful polyanilines can be prepared through the use of chemical and electrochemical synthetic procedures referred to, for example, in the above references.

The Functionalized Protonic Acid

A second ingredient of the colored compositions of the present invention is one or more "functionalized protonic acids" in which the counter-ion(s) have been functionalized so as to simultaneously or independently impart a conductivity to the composition, impart a "coloring" absorbance in the spectral range from 200 to 800 nm to the composition and exhibit compatibility with an optional organic substrate phase.

As used herein, the terms "colored" or "coloring," when referencing the property of an electrically conductive polyaniline compound, composition, or article, shall mean that the compound, composition, or article has a substantial absorbance in the near infrared, visible or near ultraviolet wavelengths, preferably maximum (peak) absorbance in the spectral range of 200 to 800 nm which is at least 0.1 times its absorbance at 850 nm. (Polyanilines have a strong absorbance at 850 nm.) Preferably "colored" or "coloring" refers to the property of a polyaniline complex of this invention of presenting a substantial absorbance in the visible wavelengths and particularly a maximum (peak) absorbance in the spectral range of from about 350 nm to about 800 nm (and especially 350 nm to 750 nm) which is at least 0.1, more suitably at least 0.5, especially at least 1, more preferably at least 2 and, in the best embodiments, at least 10 times its absorbance at 850 nm.

As used herein, a "protonic acid" is an acid that protonates the polyaniline to form a complex with said polyaniline which has a conductivity greater than about $10^{-11}$ S/cm. Preferred protonic acids are those that protonate the polyaniline to form a complex, said complex having an electrical conductivity of greater than about $10^{-6}$ S/cm, and particularly preferred protonic acids are those that form a complex with the polyaniline having a conductivity of greater than about $10^{-3}$ S/cm. Amongst these particularly preferred embodiments, most preferred are those protonic acids which form a polyaniline complex having a conductivity of greater than 0.1 S/cm.

Protonic acids are well known as dopants in the conductive polymer art as shown by the reference to J. -C. Chiang and Alan G. MacDiarmid; and the reference to W. R. Salaneck et al., noted above. They can be compatible with insulating or semi-conducting substrates, but not necessarily are, and do not necessarily display absorbance in the spectral range from 200 to 800 nm. As used herein, a "functionalized" protonic acid is an acid that protonates the polyaniline to form a complex with said polyaniline, which complex has a conductivity equal to or greater than about $10^{-11}$ S/cm; which has absorbance in the spectral range from 200 to 800 nm such that the ratio of the maximum absorbance in said range to the absorbance at 850 nm, is greater than 0.1; and which simultaneously or independently has been functionalized to be miscible with, or soluble in the substrate which makes up the third component of these products. Preferred "functionalized" protonic acids are those which meet these values and which form a complex with polyaniline presenting a substantial absorbance in the visible wavelengths and particularly a maximum (peak) absorbance in the spectral range of from about 350 nm to about 800 nm (and especially 350 nm to 750 nm) which is at least 0.1, more suitably at least 0.5, especially at least 1, more preferably at least 2 and, in the best embodiments, at least 10 times its absorbance at 850 nm.

Functionalized protonic acids that form an electrically conductive complex with polyaniline which has a coloring absorbance in the spectral range from 200 to 800 nm such that the ratio of the maximum absorbance in said range to the absorbance at 850 nm, is greater than 0.1, generally for use in the invention are those of Formula I:

$$A_n\text{-}D_1 \qquad \qquad \text{I}$$

wherein:

n is an integer from 1 to 5 inclusive

A is the same or different at each occurrence and is an acid functionality such as sulfonic acid, selenic acid, phosphonic acid, boric acid or a carboxylic acid group; or hydrogen sulfate, hydrogen selenate, hydrogen phosphate, and the like; and $D_1$ is an organic moiety covalently bonded to A that imparts to the compound of Formula I a coloring absorption in the spectral range from 200 to 800 nm. Such moieties generally are aromatic structures and are well-known as chromophores in the stain, dye and colorant arts.

Many of such useful functionalized protonic acids which include both the A and $D_1$ groups are commercially available, such as those tabulated in "the Sigma-Aldrich Handbook of Stains, Dyes and Indicators", by Floyd J. Green, Aldrich Chemical Company, Inc. (Milwaukee, Wis.) 1990; "Lambdachrome Laser-grade Dyes" by Ulrich Brackmann, Lambda Physik GmbH (G__ttingen, Germany) 1986; and in "Kodak, Laboratory Chemicals", Catalog No. 54, pp. 895–901 (1990). These references are incorporated herein by-reference. Illustrative examples of useful functionalized protonic acids of Formula I are pyrogallol red, pyrocatechol violet, cresol red, phenol red, xylenol blue, xylenol orange, sulforhodamine 640, sulforhodamine 620, and the like. The selection of the functionalized protonic acid naturally will depend on the desired color and absorption spectrum. This selection can readily be made by those skilled in the art, because the latter spectra are readily available and are generally supplied by the manufacturers.

Particularly preferred for use in the present invention are functionalized protonic acids that forman electrically conductive complex with polyaniline having an absorbance in the spectral range from 200 to 800 nm, and especially 350 to 800 nm and more particularly 350 to 750 nm, such that the ratio of the maximum absorbance in said range to the absorbance at 850 nm, is greater than 0.5. Amongst the particularly preferred embodiments, most preferred for use in the practice of this invention are functionalized protonic acids that forman electrically conductive complex with polyaniline and have absorbance in the spectral range from 200 to 800 nm, and especially 350 to 800 nm and more particularly 350 to 750 nm, such that the ratio of the maximum absorbance in said range to the absorbance at 850 nm, is greater than 1. In the most preferred embodiments of this invention, functionalized protonic acids are used that form an electrically conductive complex with polyaniline and have absorbance in the spectral range from 200 to 800 nm, and especially 350 to 800 nm and more particularly 350 to 750 nm, such that the ratio of the maximum absorbance in said range to the absorbance at 850 nm, is greater than 10.

The functionalized protonic acids employed of the compositions of the present invention are acids that form an electrically conductive complex with the polyaniline, which complex has a conductivity equal to or greater than about $10^{-11}$ S/cm; which have absorbance in the spectral range from 200 to 800 nm, and especially 350 to 800 nm and more particularly 350 to 750 nm, such that the ratio of the maximum absorbance in said range to the absorbance at 850 nm, is greater than 0.1, more suitable at least 0.5, especially at least 1, more preferably at least 2 and, in the best embodiments, at least 10; and which preferably have been functionalized to simultaneously or independently be miscible with, or soluble in a substrate, which makes up the optional third insulating or semiconducting component of these products. The requirements for the latter phenomenon to occur have been disclosed in U.S. patent application Ser. No. 714,165. This functionalization allows the colored, conductive polyaniline complex to be homogenized into the substrate through solubilization intimate mixing and the like. This dissolving and/or intimate mixing leads to the formation of an essentially continuous network of the conductive species in the substrate, which imparts a relatively high level of conductivity to the overall composition, even at very low concentrations of the polyaniline complex.

If so desired, mixtures more than one functionalized protonic acid can be used. In this case, not all the protonic acids need to form "colored" complexes so long as the overall composition is "colored." For example, in the case where one functionalized protonic acid provides a high absorbance in a desired spectral range, but imparts relatively low electrical conductivity to the polyaniline complex, and another functionalized protonic acid which may not display a strong desired absorbance, but imparts a very high conductivity to the overall composition. Numerous examples of such acids are shown in the above-noted and incorporated patents and applications. Alternatively, more than one functionalized protonic acid can be used in cases where one functionalized protonic acid provides a high absorbance in a desired spectral range, but induces insufficient processability of the polyaniline complex, and another functionalized protonic acid which may not display the desired absorbance, but imparts excellent solubilization, intimate miscibility and the like to the PANi-complex. Similarly, two or more functionalized protonic acids can be used, each of which is "colored" to give a different tint or hue to the final composition.

All of these protonic acids (both functionalized and not) are themselves counterions plus ionizable protons which are not expressly shown in General Formula I. These counterions can range in polarity from very polar to nonpolar or weakly polar. The relationship of counterion structure to polarity is set forth in U.S. patent application Ser. No. 714,165. The nature of the protonic acid counterion often leads to preferences in the selection of substrates.

The Substrate Phase

An optional third component of the materials from which the compositions of this invention are formed is the substrate. Substrates are insulating or semiconducting materials. Substrates can be organic solvents, or it can be monomers, bulk oligomeric or polymeric or pre-polymeric materials which can be transformed into a fluid (liquid or semisolid) form during processing so as to achieve the required intimate mixing (solution or the like) with the polyaniline and the functionalized protonic acid. In the case of nonpolar or weakly polar counter-ions of the functionalized protonic acids, it is preferred to use nonpolar or weakly polar solvents, monomers or polymers or mixtures thereof as substrates. Conversely, more polar counter-ions of the functionalized protonic acid will require more polar solvents, monomers or polymers. Illustrative of useful common solvents or monomers are: substituted or unsubstituted aromatic hydrocarbons such as benzene, toluene, p-xylene, m-xylene, styrene, aniline and the like; higher alkanes such as hexane, heptane, octane and the like; halogenated alkanes such as chloroform, bromoform, dichloromethane and the like; halogenated aromatic hydrocarbons such as chlorobenzene, dichlorobenzenes; higher alcohols such as butanols, hexanols and the like; dimethylformamide, N-methyl pyrrolidone, formic acid, acetic acid, dimethylsulfoxide, propylene carbonate, methylmethacrylate, and the like. Illustrative of useful polymeric substrates are polyethylenes, isotactic polypropylene, elastomers, such as styrene-butadiene-styrene (SBS) copolymers, polybutadiene, and the like, poly(vinylchloride), polystyrene, poly(vinylalcohol), poly-(ethylene terephthalate), nylons, such as nylon 6, nylon 6.6, nylon 12 and the like; poly(methylmethacrylate), polycarbonate, acrylonitrile butene styrene copolymers, and the like.

Overall Compositions

The proportions of the polyaniline, protonic acid and substrate materials are not critical and can vary widely, depending on the desired level of electrical conductivity and color of the final compositions within the ranges set forth herein. Generally, conductivity is a direct function of the proportion of conductive complex in the composition with high contents of conductive polyaniline complex being required to impart a high conductivity to the overall composition. Similarly, color intensity varies directly with functionalized protonic acid content with a larger fraction of functionalized protonic acid with absorption in the spectral range from 200 to 800 nm being required for more intensely colored compositions. In general, in the cases where a temporary solvent substrate is present the amount of solvent substrate as a proportion of the overall solution is not critical and can be readily adjusted by those skilled in the art of polymer processing to meet the specific processing requirements for manufacturing of useful articles.

Typically, the compositions of this invention include one or more polyanilines, one or more functionalized protonic acids, and one or more solvent or plasticized substrates. The relative proportions of these materials can range as follows:

| | |
|---|---|
| 0.01% to 100% | by weight of polyaniline plus protonic acid |
| 99.99% to 0% | of substrate, preferably |
| 0.01% to 99% | by weight of polyaniline plus protonic acid, |
| 99.99% to 1% | of substrate, and more preferably |
| 0.05 to 50% | of polyaniline plus protonic acid and |
| 99.95 to 50% | of substrate. |
| This can be broken down further for very preferred compositions which include | |
| Polyaniline(s) | 1 part by weight |
| Protonic acid(s) | From at least 1 protonic acid proton for each 10 repeat units of aniline and preferably at least one for each 8 repeat units up to 20 protonic acid protons for each aniline repeat unit - typically from 0.01 parts to 20 parts by weight. |
| Substrate(s) | 0.1 parts to 1000 parts, especially 0.5 to 500 parts by weight. |

In addition to the polyaniline homopolymer or copolymer or substituted aniline homopolymers, or copolymers thereof, one or more functionalized protonic acids and one or more substrates, the compositions of this invention can include other optional ingredients which either dissolve or do not dissolve (disperse) in the composition. The nature of such optional ingredients can vary widely, and include those materials which are known to those of skill in the art for inclusion in polymer articles as additives, fillers, and reinforcements. The total of other materials that can be present is as much as 98% of the total mixture, and being optional can be omitted altogether. Usually, for commercially attractive products these added ingredients may make up to 90% by weight of the total final product and especially 2% to 90% and more especially 5 to 80%. Particularly useful other materials for use in the compositions of the present invention are 0 to 10% by weight and especially 0.1 to 5% by weight of fluorescent and other dyes and colorants that can further enhance their optical properties.

Processing

The method of forming the colored electrically conductive composition of this invention is not critical and can vary widely. It is important, however, when substrate is present that at some stage the substrate be processed with the polyaniline and functionalized acid in a fluid (liquid, semi-solid, or molten form) to assure proper intimate mixturey. This allows the overall composition to exhibit the highly unique and advantageous property, made possible by the proper selection of protonic acid and substrate as set forth herein, of having a very high conductivity by reason of having the conductive polyaniline complex present as a continuous phase throughout the overall composition.

Otherwise, no special requirements are needed and common techniques known to those ordinarily skilled in the art of polymer processing, such as solution, gel and melt blending, can be applied. Also, common manufacturing methods may be used to fabricate useful colored, electrically conductive articles from the compositions of the present invention. It will be appreciated by those skilled in the art of polymer product manufacturing that a variety of technologies may be utilized, depending on the nature and shape of the desired article or product, such as melt-spinning, solution spinning, gel spinning, melt blowing, injection molding, film casting, drawing and the like.

The following specific examples are presented to illustrate the invention and are not to be construed as limitations thereon.

EXAMPLE 1

Polyaniline in its emeraldine base form, 0.0543 g (0.0006M on the base of the repeat unit, denoted PhN), was mixed thoroughly with 0.12 g (0.0003M) of pyrogallol red (Aldrich) using an agate mortar and pestle in a dry bag filled with nitrogen. The molar ratio of pyrogallol red to emeraldine base repeat unit was 0.5. Using a laboratory press, the resulting mixture was pressed into a pellet at room temperature and at 165° C. The electrical conductivities of the samples were measured using the standard four-probe method. The measured conductivities are listed in Table 1.

EXAMPLE 2

Example 1 was repeated, but instead of pyrogallol, emeraldine base was mixed with other sulfodyes, pyrocatechol violet, cresol red, phenol red, xylenol blue, xylenol orange (Aldrich), sulforhodamine 640 and sulforhodamine B (Lamda Physik). Conductivity data of the resulting complexes are listed in Table 1.

TABLE 1

Conductivity of Complexes of Polyaniline with Selected Sulfo-Dyes

| Dye | Dye/PhN molar ratio | Conductivity (S/cm) | |
|---|---|---|---|
| | | pressed at RT | pressed at 165° C. |
| pyrogallol red | 0.5 | $6.4 \times 10^{-2}$ | $1.2 \times 10^{-1}$ |
| pyrocatechol violet | 0.5 | $3.7 \times 10^{-4}$ | $1.9 \times 10^{-2}$ |
| cresol red | 0.5 | $3.8 \times 10^{-6}$ | $2.2 \times 10^{-4}$ |
| phenol red | 0.5 | $4.9 \times 10^{-5}$ | $8.1 \times 10^{-4}$ |
| xylenol blue | 0.5 | $4.9 \times 10^{-8}$ | $2.1 \times 10^{-6}$ |
| xylenol orange | 0.5 | $1.1 \times 10^{-5}$ | $1.8 \times 10^{-6}$ |
| sulforhodamine 640 | 0.5 | $1.3 \times 10^{-6}$ | $3.8 \times 10^{-5}$ |
| sulforhodamine 620 | 0.5 | $2.7 \times 10^{-7}$ | $8.0 \times 10^{-6}$ |

EXAMPLE 3

An amount of 0.1 g of each of the polyaniline-dye mixtures of Examples 1 and 2 was dissolved in 4.9 g of m-cresol by ultrasonic treatment at 50° C. The colors of the solutions of the PANi-sulfodye complexes were essentially the same as that of the pure dyes dissolved in m-cresol. The absorption spectrum of the PANi-xylenol blue complex in m-cresol is shown as an illustrative example in FIG. 1. The relatively weak absorption observed around 800–900 nm is typical of the conducting form of polyaniline which is indicative of complex formation between the emeraldine base and the sulfo-dye. The spectrum also exhibits a strong absorbance at about 550 nm originating from the dye. The ratio of the maximum absorbance at 550 nm to the absorbance at 850 nm is 16.6.

EXAMPLE 4

Figure 2:
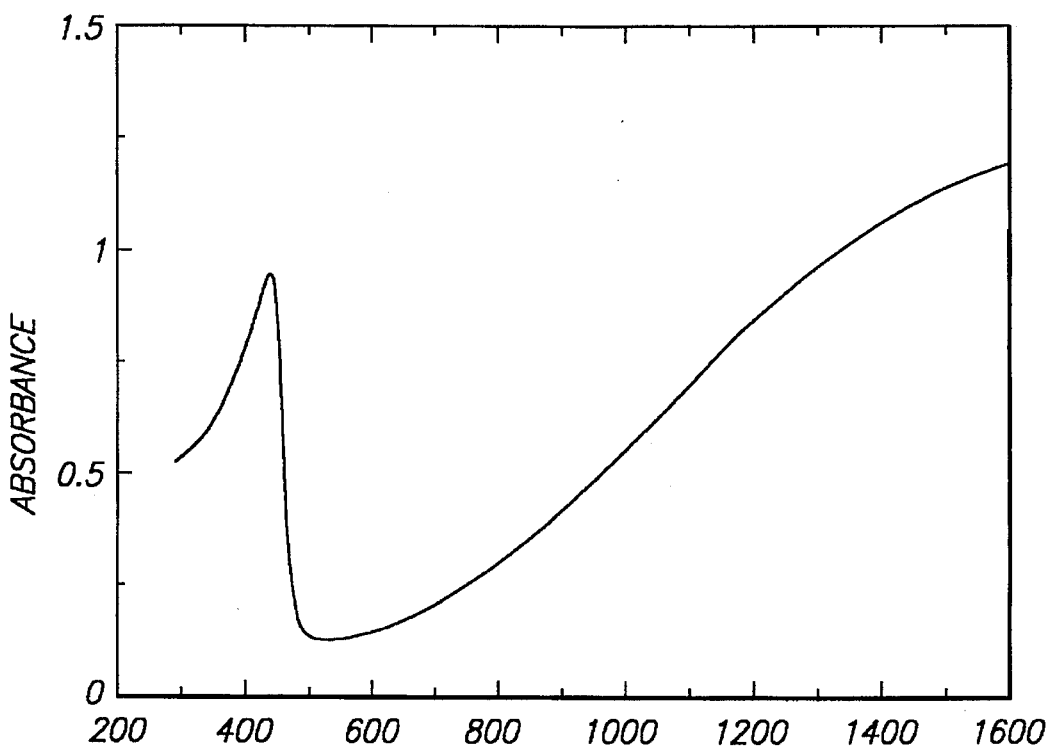
FIG. 2 shows the absorption spectrum of a PANi-camphor sulfonic acid (CSA) complex of the art in solution in m-cresol.
Figure 3:
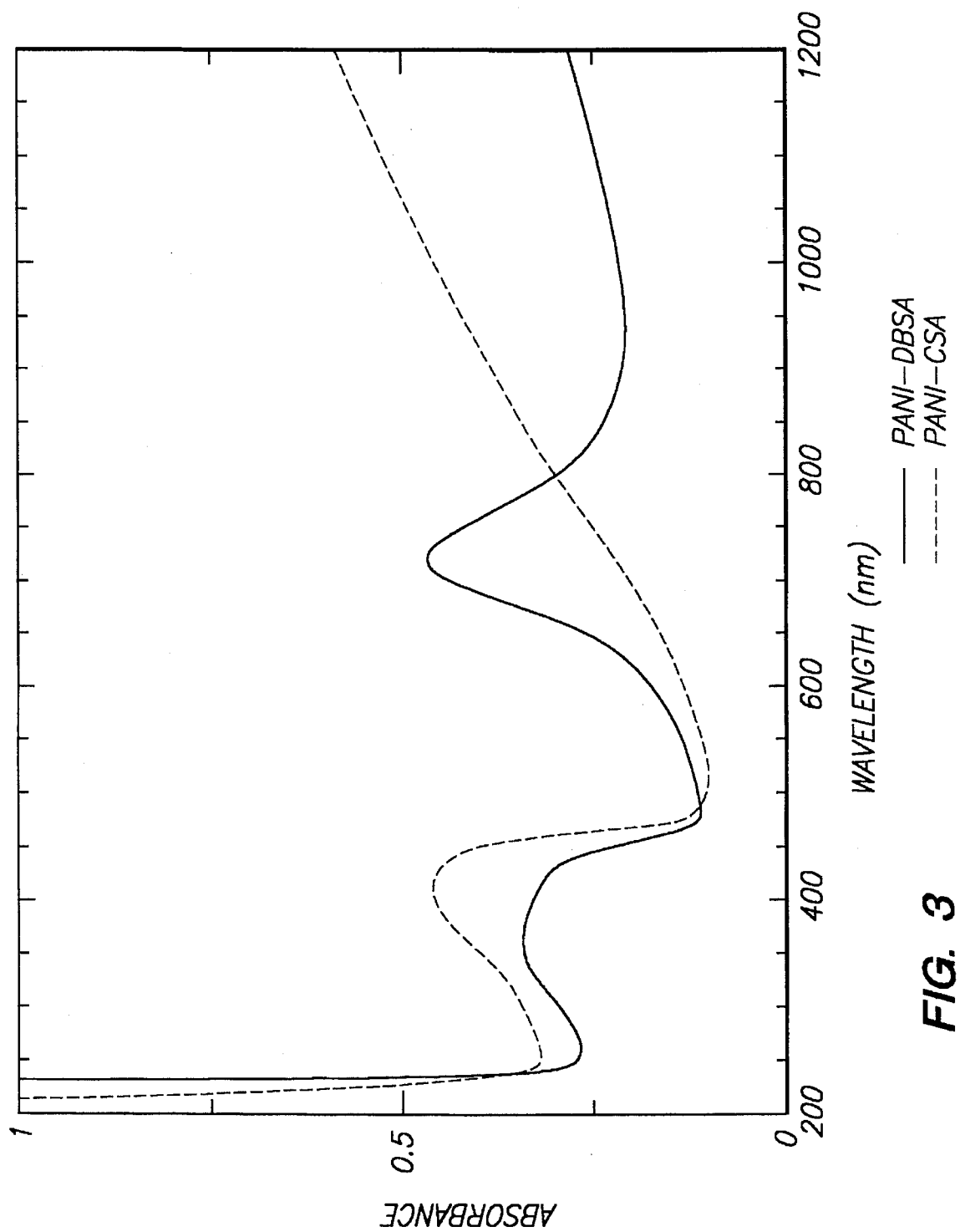
FIGS. 3 through 7 show absorption spectra for additional conducting polyaniline compositions of the art which spectra are consistent with the classic blue/green/black color exhibited by such materials.
Figure 4:
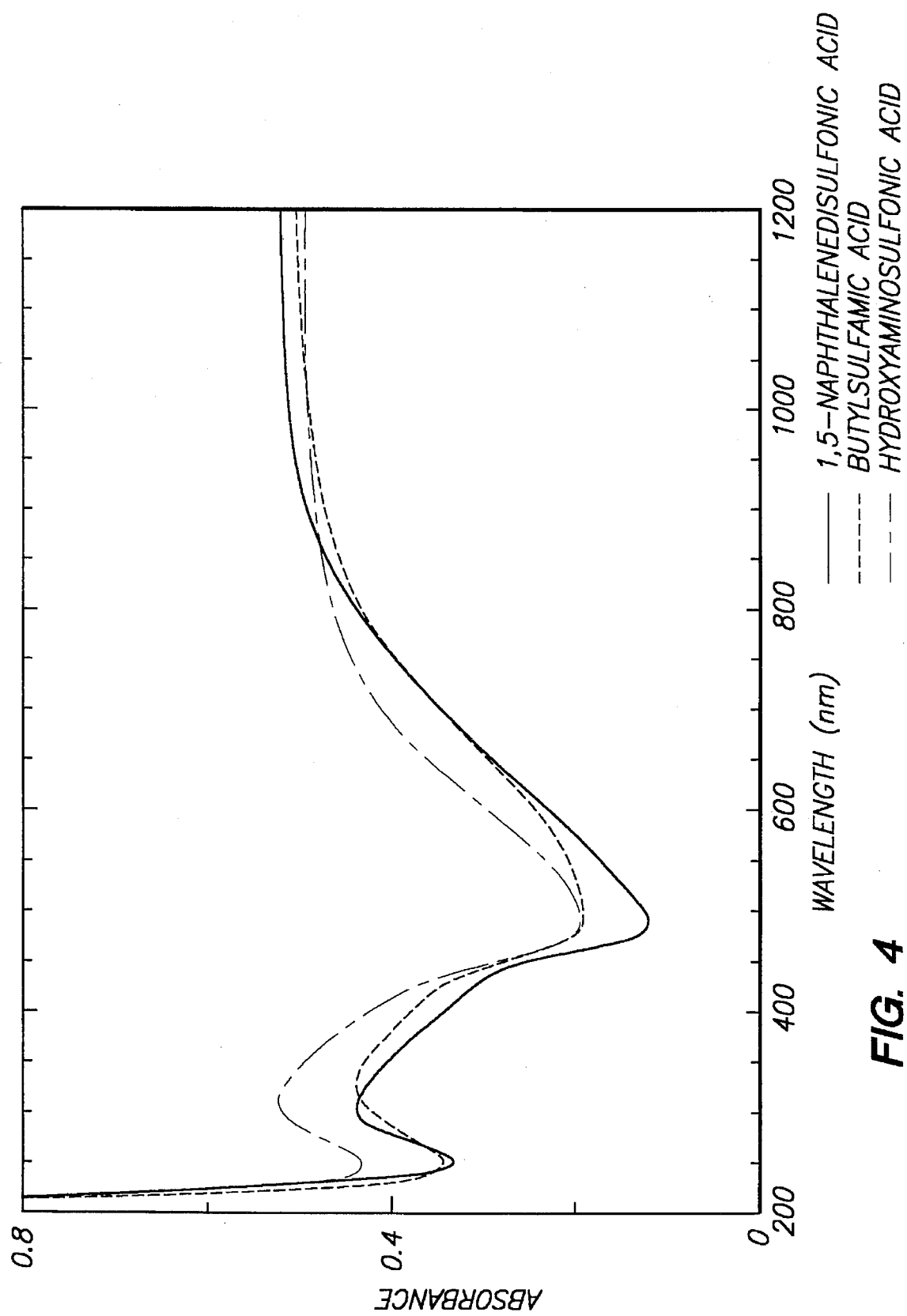
Figure 5:
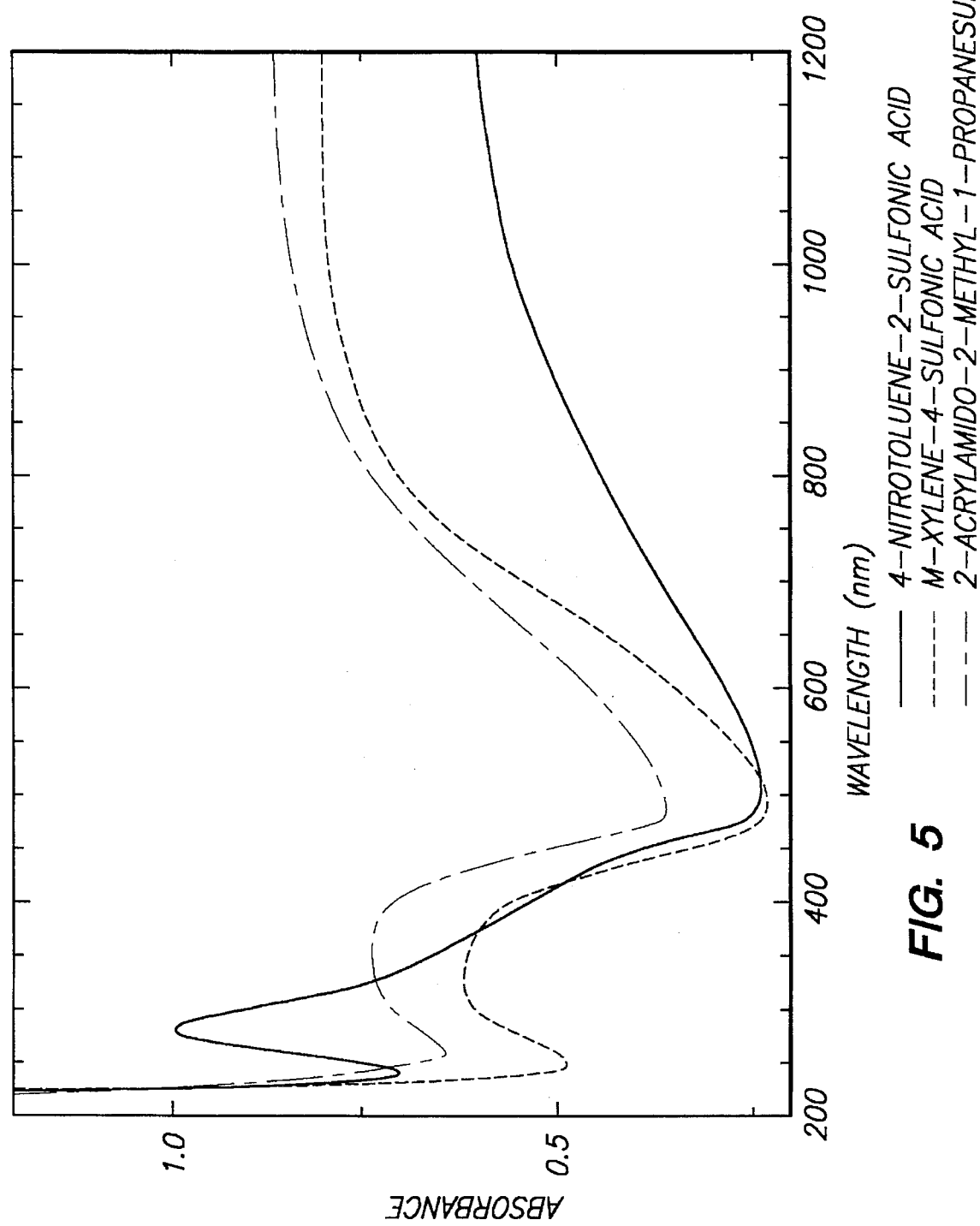
Figure 6:
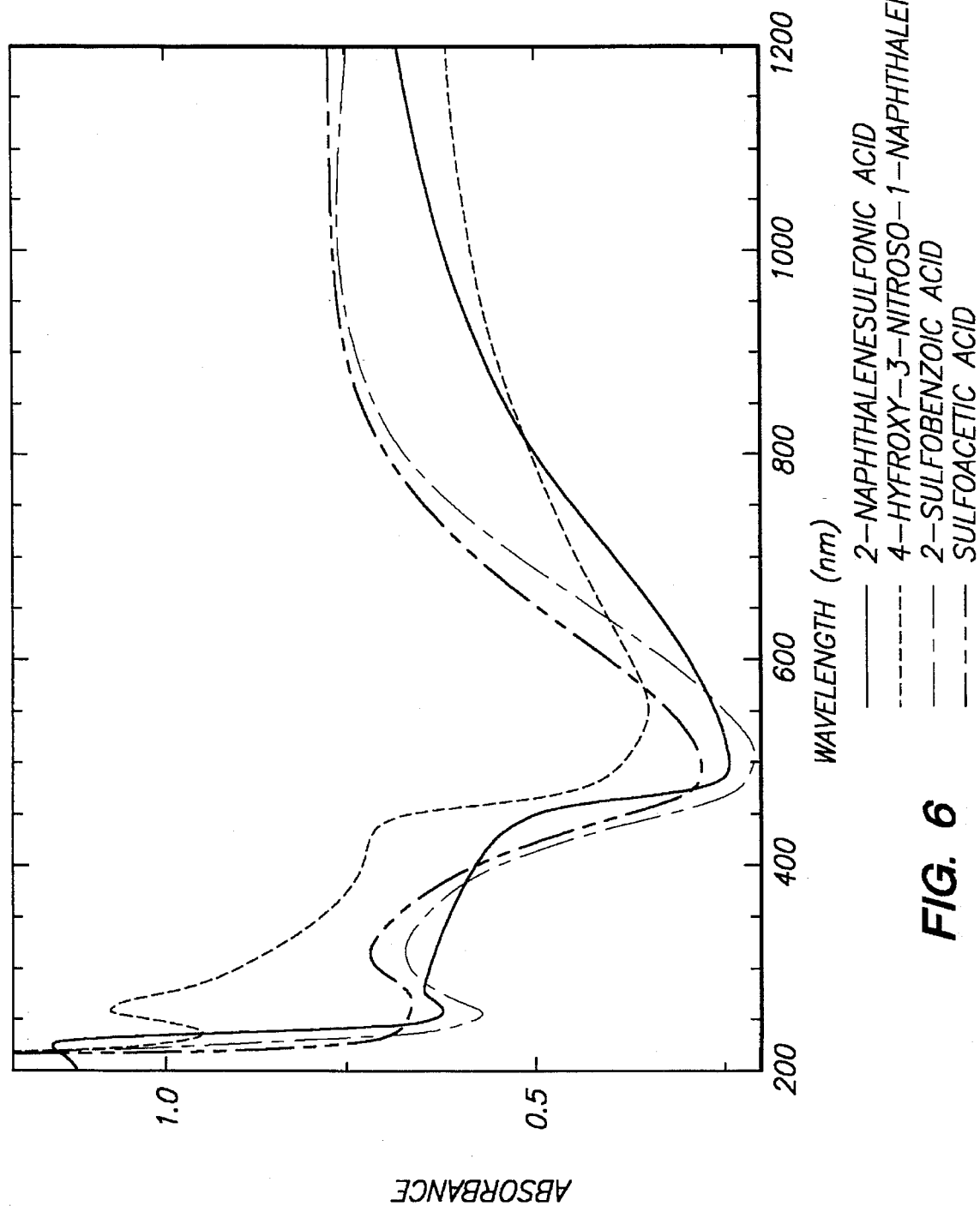
Figure 7:
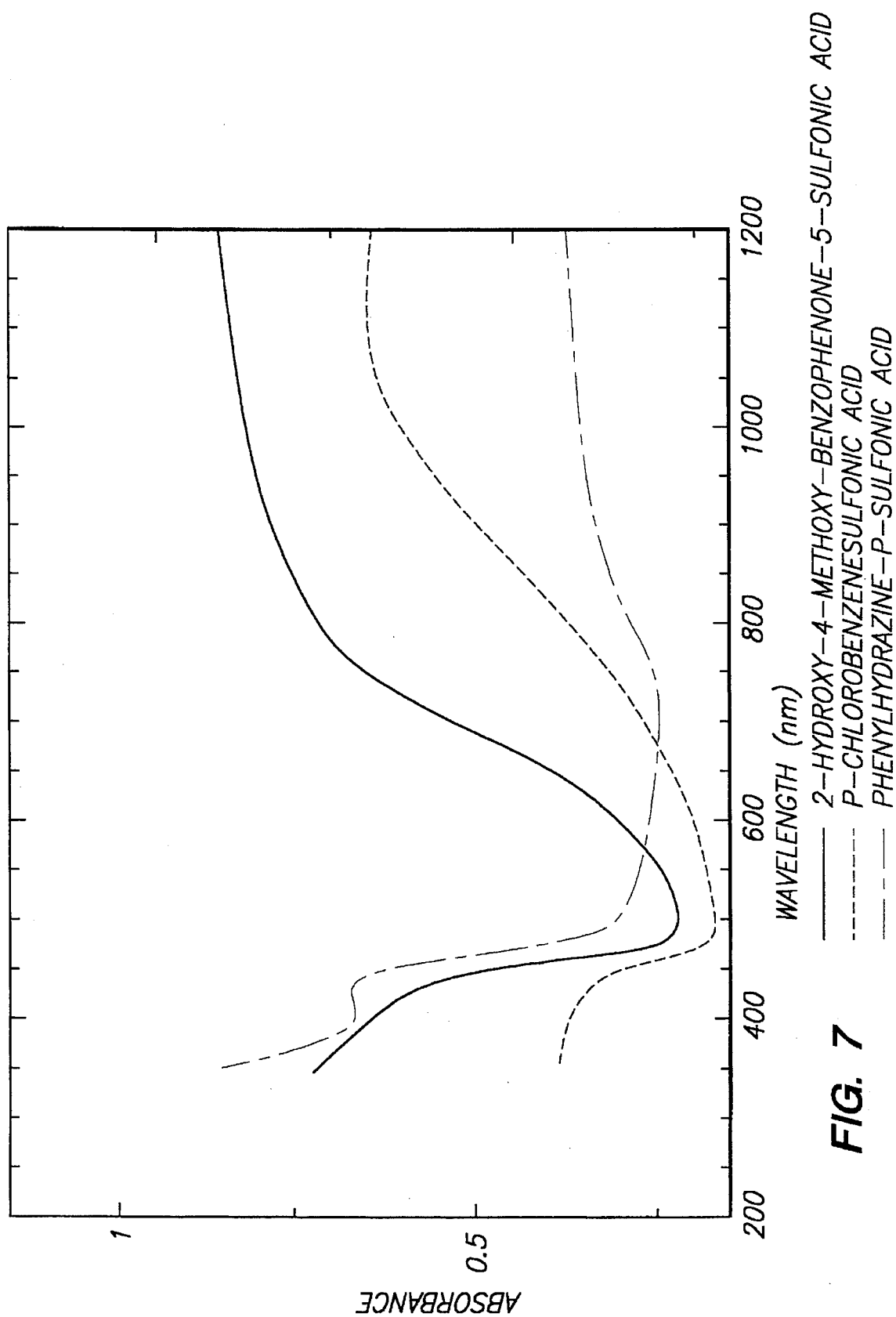

Emeraldine base, 1.81 g (0.02M), was mixed with 2.32 g (0.01M) of (±)-10-camphorsulfonic acid [CSA] (Aldrich) using an agate mortar and pestle in inert atmosphere (i.e. in a glove-bag filled with nitrogen gas). The molar ratio of CSA to the PhN repeat unit was 0.5. A quantity (1.0 g) of the resulting mixture was placed into 49.0 g of m-cresol, and treated in an ultrasonic bath. The polyaniline-CSA complex dissolved completely to give a viscous, deep green solution. The solution was cast onto a glass surface. After evaporation of the solvent, a flexible free-standing film was obtained. The absorption spectrum of the cast film is shown in FIG. 2.

EXAMPLE 5

An amount of 0.2 g of the solution, prepared as in Example 3, was mixed with 1 g of a 10% (w/w) solution of common poly(methyl methacrylate) [PMMA] in m-cresol. The PANi-sulfodye content in the solution was 2%. The resulting homogeneous solution was cast onto a glass slide. Subsequently, the slide was put on a hot plate at 50° C. in air to remove the m-cresol from the film. Transparent, free-standing polyblend films were obtained with a thickness in the range of 20–30 μm. The electrical conductivities of the free-standing films were measured using the standard four-probe method. The results are summarized in Table 2. Pure dye/PMMA blend films were prepared in a similar way, for comparison purposes.

EXAMPLE 6

Figure 8:
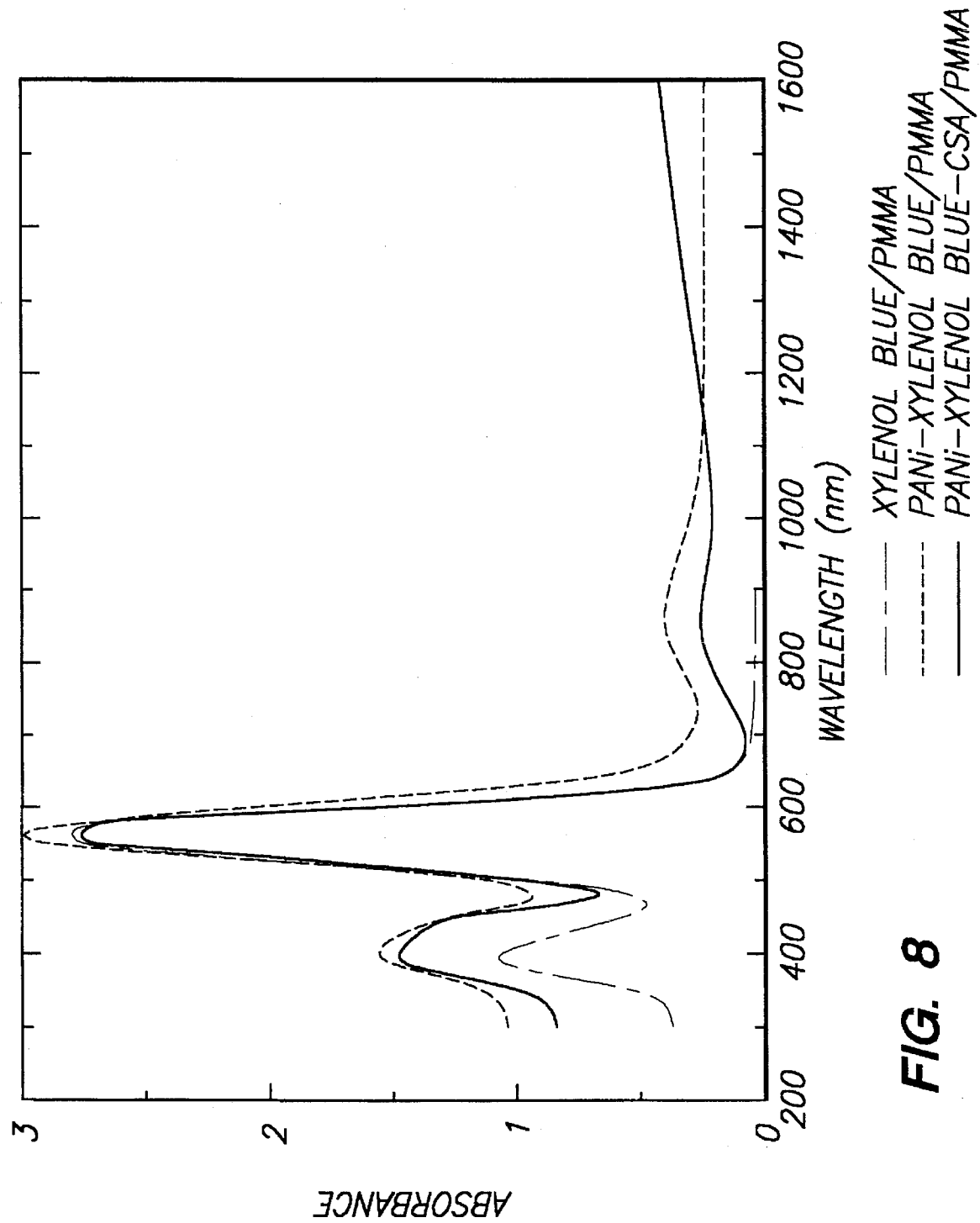
FIG. 8 compares solid-state absorption spectra of a blend of xylenol blue and poly(methylmethacrylate) (PMMA); a blend composed of a PANi-xylenol blue complex and PMMA; and a blend of a PANi-xylenol blue-CSA complex and PMMA; represented by, respectively, the mixed dashed, dashed and solid lines in the graph.

Example 5 was repeated, but 0.05 g of the PANi-CSA solution of Example 4 was added at room temperature to solutions as prepared in Example 5. Homogeneous solutions were obtained of polyaniline complexed with both CSA and the sulfo-dyes and were of essentially the same color as the solutions of the pure dyes. The solutions were cast and dried at 50° C. to yield tough, flexible free-standing films. The colors of the resulting transparent and conducting PANi-complex/PMMA blend films were very similar to those of the reference dye/PMMA films. FIG. 8 compares the absorption spectra of xylenol blue/PMMA, PANi-xylenol blue and PANi-xylenol blue-CSA/PMMA blend films. The strong absorption peak for xylenol blue at around 550 nm remained almost unchanged after casting with PMMA. The typical absorption peak associated with the conducting form of polyaniline at around 850 nm was weak; as a result of which the conducting blend film exhibited essentially the same color as the pure dye, while the conductivity of the film increased sometimes by 7–8 orders of magnitude. This is indicated by the conductivity data shown in Table 2. The ratio of the maximum absorbance at 550 nm to the absorption at 850 nm were, respectively, 6.6 and 10.3 for the PANi-xylenol blue/PMMA and the PANi-xylenol blue-CSA/PMMA films.

TABLE 2

Comparison of the Conductivity of Sulfo-Dyes, PANi/Sulfo-Dye Complexes and PANi/Sulfo-Dye/CSA Complexes Blended with PMMA

| Sulfo-dye | Concentration in PMMA (% w/w) | | | Conductivity (S/cm) | color* |
|---|---|---|---|---|---|
| | dye | PANi-dye | PANi-CSA | | |
| pyrogallol red | 4.0 | | | $<10^{-11}$ | red-orange |
| | | 2.0 | | $4.2 \times 10^{-9}$ | red-brown |
| | | 2.0 | 1.5 | $5.2 \times 10^{-1}$ | red-brown |
| pyrocatechol violet | 4.0 | | | $<10^{-11}$ | violet |
| | | 2.0 | | $3.0 \times 10^{-9}$ | dark-purple |
| | | 2.0 | 1.5 | $4.6 \times 10^{-1}$ | dark-purple |
| cresol red | 4.0 | | | $<10^{-11}$ | red |
| | | 2.0 | | $2.0 \times 10^{-1}$ | dark-red |
| | | 2.0 | 1.0 | $1.4 \times 10^{-9}$ | dark-red |
| phenol red | 4.0 | | | $<10^{-11}$ | red-brown |
| | | 2.0 | | $3.0 \times 10^{-9}$ | red-brown |
| | | 2.0 | 1.0 | $2.4 \times 10^{-1}$ | red-brown |

TABLE 2-continued

Comparison of the Conductivity of Sulfo-Dyes, PANi/Sulfo-Dye Complexes and PANi/Sulfo-Dye/CSA Complexes Blended with PMMA

| Sulfo-dye | Concentration in PMMA (% w/w) | | | Conductivity (S/cm) | color* |
|---|---|---|---|---|---|
| | dye | PANi-dye | PANi-CSA | | |
| xylenol blue | 4.0 | | | $<10^{-11}$ | purple |
| | | 2.0 | | $2.3 \times 10^{-6}$ | purple |
| | | 2.0 | 1.0 | $4.8 \times 10^{-2}$ | purple |
| xylenol orange | 4.0 | | | $<10^{-11}$ | yellow-green |
| | | 2.0 | | $1.2 \times 10^{-5}$ | yellow-green |
| | | 2.0 | 1.0 | $6.8 \times 10^{-3}$ | yellow-green |
| sulforhoda-mine 640** | 5.0 | | | $<10^{-11}$ | blue |
| | | 5.0 | | $\sim 10^{-10}$ | purple |
| | | 5.0 | 0.5 | $3.4 \times 10^{-8}$ | purple |
| sulforhoda-mine B** | 5.0 | | | $<10^{-11}$ | purple |
| | | 5.0 | | $\sim 10^{-10}$ | purple |
| | | 5.0 | 0.5 | $4.0 \times 10^{-8}$ | purple |

*color in transmitting light
**fluorescent dye

EXAMPLE 7

An amount of 2 g of DCM(4-dicyanomethylene-2-methyl-6-(p-dimethylaminostyryl)4H-pyran) (Exciton) was dissolved in 10 g m-cresol. A quantity of 0.5 g of the resulting solution was mixed with 3.8 g of a 10% (w/w) solution of PMMA in m-cresol and 0.5 g of the PANi-CSA solution of Example 4. The resulting homogeneous solution was cast onto a glass surface, and the solvent was evaporated at 50° C. in air. Transparent, free-standing red polyblend films were obtained with thicknesses in the range 20–30 μm. The experiment was repeated, but the amounts of the added PANI-CSA solutions were 0.0 (reference), 0.02, 0.05, and 0.2 g. The electrical conductivities of resulting blend films are shown in Table 3.

EXAMPLE 8

Example 7 was repeated with disperse red(red) solvent blue(blue), solvent yellow(yellow) dyes. Conductivity data of the blend films are shown in Table 3.

Examples 7 and 8 illustrate the use of non-sulfonic acid dyes for use in the fabrication of colored, conductive polyaniline materials.

TABLE 3

Characteristics of blend films of dye/PANi-CSA/PMMA films

| Dye | Concentration in PMMA blend (wt %) | | Conductivity (S/cm) | Color* |
|---|---|---|---|---|
| | dye | PANi-CSA | | |
| DCM** | 5 | 0 | $<10^{-11}$ | red |
| DCM | 5 | 0.1 | $\sim 10^{-10}$ | red |
| DCM | 5 | 0.25 | $\sim 10^{-10}$ | red |
| DCM | 5 | 1.0 | $2 \times 10^{-3}$ | red |
| DCM | 5 | 2.5 | $1.7 \times 10^{-1}$ | red-orange |
| Solvent blue | 4 | 0 | $<10^{-11}$ | blue |
| Solvent blue | 4 | 0.5 | $5.4 \times 10^{-4}$ | blue |
| Solvent | 4 | 1.0 | $2.7 \times 10^{-2}$ | blue |

TABLE 3-continued

Characteristics of blend films of dye/PANi-CSA/PMMA films

| Dye | Concentration in PMMA blend (wt %) | | Conductivity (S/cm) | Color* |
|---|---|---|---|---|
| | dye | PANi-CSA | | |
| blue | | | | |
| Solvent blue | 4 | 2.0 | $8.5 \times 10^{-2}$ | blue |
| Disperse red | 4 | 0 | $<10^{-11}$ | red |
| Disperse red | 4 | 0.5 | $3.2 \times 10^{-4}$ | red |
| Disperse red | 4 | 2.0 | $1.4 \times 10^{-1}$ | red |
| Disperse yellow | 4 | 0 | $<10^{-11}$ | yellow |
| Disperse yellow | 4 | 2.0 | $1.0 \times 10^{-1}$ | yellow-green |

*color in transmitting light

EXAMPLE 9

Example 6 was repeated, but instead of PMMA, 10% (w/w) solutions of, respectively, Nylon 12, Nylon 4.6, Trogamid (amorphous nylon, Auls Huls), polystyrene, ABS, polyvinylacetate, polycarbonate, polysulfone and polyvinylpyrrolidone in m-cresol were added to the PANi-xylenol blue-CSA solution in m-cresol. In all cases purple polyblend films were obtained. The electrical conductivity of resulting films are shown in Table 4. This Example shows that colored conducting polyaniline compositions can be made from a wide range of commercially available polymers.

TABLE 4

Conductivity of of blend films of PANi-xylenol blue-CSA complexes with different commercial polymers

| Polymer | Concentration in blend (wt %) | | Conductivity (S/cm) |
|---|---|---|---|
| | PANi-xylenol blue | PANi-CSA | |
| Nylon 12 | 2.0 | 1.0 | $2.7 \times 10^{-3}$ |
| | 2.0 | 2.0 | $5.8 \times 10^{-2}$ |
| Trogamid (amorphous Nylon) | 2.0 | 1.0 | $1.2 \times 10^{-3}$ |
| Polystyrene | 2.0 | 1.0 | $5.0 \times 10^{-4}$ |
| | 2.0 | 2.0 | $9.5 \times 10^{-2}$ |
| ABS | 2.0 | 1.0 | $7.3 \times 10^{-3}$ |
| | 2.0 | 2.0 | $9.0 \times 10^{-2}$ |
| PVAc | 2.0 | 1.0 | $1.3 \times 10^{-6}$ |
| | 2.0 | 2.0 | $2.6 \times 10^{-3}$ |
| Polycarbonate | 2.0 | 1.0 | $3.4 \times 10^{-2}$ |
| | 2.0 | 1.0 | $1.0 \times 10^{-1}$ |
| Polysulfone | 2.0 | 1.0 | $7.0 \times 10^{-2}$ |
| Polyvinyl-pyrrolidone | 5.0 | 1.0 | $2.2 \times 10^{-8}$ |

EXAMPLE 10

The nonconductive form of polyaniline, 0.046 g(0.0005M), was mixed in an Agate mortar and pestle with 0.082 g DBSA (0.00025M) and 0.076 g of the PANi-Phenol red complex of Example 2 and 0.254 g of powdery linear polyethylene (PE; GR 2755; $M_w$=200,000) in a dry bag filled with nitrogen. The mixture was pressed at 160° C. between hot plate for 30 seconds; the 30 second hot-precessing step was repeated three more times to assure uniform mixing. The weight ratio of the PANi-Phenol red complex and PANi-DBSA complex to the total polymer was 0.16 and 0.28 respectively. The above experiment was repeated, but the amount of PANi-DBSA complex was varied such that the weight ratio of the PANi-DBSA complex to the total polymer was 0.16, 0.0.1 and 0.045 and 0.0. The electrical conductivity of the resulting, deep red films were measured and the results are shown in Table 5.

TABLE 5

Conductivity of of melt blended films of PANi-Phenol red-DSA complexes with PE

| Concentration in PE blend (wt %) | | Conductivity (S/cm) |
|---|---|---|
| PANi-Phenol red | PANi-DBSA | |
| 16 | 0 | $2.0 \times 10^{-10}$ |
| 16 | 4.5 | $1.5 \times 10^{-9}$ |
| 16 | 10 | $6.0 \times 10^{-9}$ |
| 16 | 16 | $1.0 \times 10^{-8}$ |
| 16 | 28 | $2.0 \times 10^{-8}$ |

EXAMPLE 11

Example 10 was repeated, but the molar ratio of DBSA to PhN repeat unit was 1.0; the weight ratio of PANi-DBSA to total polymer was 0.376, 0,322, 0.244, 0.142, and 0.078, respectively. The electrical conductivity data of the blends are shown in the Table 6.

TABLE 6

Conductivity of melt blended films of PANi-Phenol red-DSA complex with PE

| Concentration in blend (wt %) | | Conductivity (S/cm) |
|---|---|---|
| PANi-Phenol red | PANi-DBSA | |
| 16 | 0 | $2.0 \times 10^{-10}$ |
| 16 | 7.8 | $1.7 \times 10^{-10}$ |
| 16 | 14.3 | $3.0 \times 10^{-10}$ |
| 28 | 32.2 | $1.5 \times 10^{-4}$ |
| 16 | 37.5 | $9.3 \times 10^{-4}$ |

EXAMPLE 12

Example 10 was repeated but with Xylenol blue in stead of Phenol red, and the weight fraction of PANi-DBSA complex in the blend was 0.1, 0.3, 0.5 and 0.6, respectively. The electrical conductivities of the resulting films is shown in Table 7.

TABLE 7

Conductivity of melt blended films of PANi-Xylenol blue complex with PE

| Concentration in blend (wt*) | | Conductivity (S/cm) |
|---|---|---|
| PANi-Xylenol blue | PANi-DBSA | |
| 16 | 10 | $1.5 \times 10^{-8}$ |
| 16 | 20 | $1.3 \times 10^{-7}$ |
| 16 | 30 | $2.6 \times 10^{-7}$ |
| 16 | 50 | $1.8 \times 10^{-6}$ |
| 16 | 60 | $8.4 \times 10^{-2}$ |

We claim:

1. A colored electrically conductive polymeric composition comprising one or more polyanilines in complexing admixture with an effective protonating amount of one or more protonic acids, said protonic acids being functionalized so as to simultaneously or independently impart a conductivity to the composition greater than about $10^{-6}$ S/cm and absorbance to the composition in the spectral range from 350 to 800 nm such that the ratio of the maximum absorbance in said range to the absorbance at 850 nm, is greater than 2.0, wherein said one or more protonic acids includes a protonic acid selected from the group consisting of pyrogallol red, pyrocatechol violet, cresol red, phenol red, xylenol blue, xylenol orange, sulforhodamine 640, sulforhodamine 62, 4-dicyanomethylene-2-methyl-6-(p-dimethylstyryl)4H-pyran, disperse red, solvent blue, and solvent yellow.

2. The composition of claim 1 composed of from 0.01 to 99% by weight of polyanilines plus protonic acids.

3. The composition of claim 1 having a conductivity of at least $10^{-3}$ S/cm.

4. The composition of claim 1 having a conductivity of at least 0.1 S/cm.

5. The composition of claim 1 having absorbance in the spectral range from 350 to 800 nm such that the ratio of the maximum absorbance in said range to the absorbance at 850 nm, is greater than 10.

6. The composition of claim 5 having a conductivity of at least $10^{-3}$ S/cm.

7. The composition of claim 5 having a conductivity of at least 0.1 S/cm.

8. Shaped articles comprising a composition of claims 1, 2, 3, 4, 5, 6 and 7.

9. A colored, electrically conductive polymeric composition comprising one part by weight total of one or more polyanilines in complex combination with one or more protonic acids in a proportion to provide from 1 protonic acid proton for each 8 repeat units of polyaniline to about 20 protonic acid protons for each polyaniline repeat unit and from 0.5 to 500 parts by weight of an insulating or semiconducting organic substrate selected from organic solvents, monomers, bulk oligomeric or polymeric or pre-polymeric materials which can be transformed into a fluid form during a processing step of mixing said substrate with said one or more polyanilines and said one or more protonic acids, wherein at least one of the protonic acids includes a counterion which imparts absorbance to the polymeric composition in the spectral range of from 350 to 800 nm such that the ratio of the maximum absorbance in this range to the absorbance at 850 nm is greater than 2 and wherein the complex combination of polyanilines and protonic acids imparts a conductivity to the composition which is greater than $10^{-6}$ S/cm, and wherein said one or more protonic acids includes a protonic acid selected from the group consisting of pyrogallol red, pyrocatechol violet, cresol red, phenol red, xylenol blue, xylenol orange, sulforhodamine 640, sulforhodamine 62, 4-dicyanomethylene-2-methyl-6-(p-dimethylstyryl)4H-pyran, disperse red, solvent blue, and solvent yellow.

10. The composition of claim 9 having a conductivity of at least $10^{-3}$ S/cm.

11. The composition of claim 9 having a conductivity of at least 0.1 S/cm.

12. The composition of claim 9 having absorbance in the spectral range from 350 to 800 nm such that the ratio of the maximum absorbance in said range to the absorbance at 850 nm, is greater than 10.

13. The composition of claim 12 having a conductivity of at least $10^{-3}$ S/cm.

14. The composition of claim 12 having a conductivity of at least 0.1 S/cm.

15. Shaped articles comprising a composition of claims 9, 10, 11, 12, 13 or 14.

* * * * *